Feb. 6, 1923.

J. MOSS.
COTTON PREPARING MACHINE AND THE LIKE.
ORIGINAL FILED MAY 29, 1922.

1,444,516.

Witness:
Oscar F. Hill

Inventor:
Joseph Moss
By Chas. F. Randall
Attorney.

Patented Feb. 6, 1923.

1,444,516

UNITED STATES PATENT OFFICE.

JOSEPH MOSS, OF WOONSOCKET, RHODE ISLAND, ASSIGNOR TO WOONSOCKET MACHINE & PRESS CO., INC., OF WOONSOCKET, RHODE ISLAND, A CORPORATION OF RHODE ISLAND.

COTTON-PREPARING MACHINE AND THE LIKE.

Original application filed May 29, 1922, Serial No. 564,322. Divided and this application filed June 6, 1922. Serial No. 566,358.

*To all whom it may concern:*

Be it known that I, JOSEPH MOSS, a citizen of the United States, residing at Woonsocket, in the county of Providence, State of Rhode Island, have invented a certain new and useful Improvement in Cotton-Preparing Machines and the like, of which the following is a specification, reference being had therein to the accompanying drawings.

The present invention is a division of the generic invention upon which is based my application for U. S. Letters Patent filed May 29, 1922, Serial No. 564,322. It is applicable to machines used in preparing cotton and other fibrous materials for spinning and especially to openers and machines associated with the latter and operating to supply cotton, or the like, thereto. A particular association or assemblage of machines having the cooperative relationship just indicated is that of a so-called bale-breaker and an opener. In the case of this association or assemblage of machines, cotton in a more or less compressed state, frequently in thick sheets, taken in certain proportions from different bales of a plurality of bales from which bands and wrappings have been removed, containing cotton of different varieties or grades, is laid upon the receiving apron of a bale-breaker and by the action of the latter more or less mixed and loosened up. From the bale-breaker the cotton passes through a short flue to the adjoining opener, by which the cotton is effectually opened up and torn apart, with the separation of dirt and the coarser and other more easily removed impurities.

It happens with more or less frequency that a bale-band buckle, a nail, a stone, or some other hard object accidentally present in the baled cotton, passes forward to the opener from the bale-breaker or other machine preceding the opener. The rotating cylinder of the opener revolves at an exceedingly high rate of speed, and consequently the striking of the teeth, blades, or beaters of the said cylinder against any such object contained in the cotton entering the opener, produces sparks, with the result that the cotton within the opener is ignited and consumed. In some cases, also, the flame extending through the flue system through which the cotton passes from the opener to a bin or a distributing system, spreads the fire so that great loss results.

The object of the invention is to provide against the entrance, into an opener or the like, of a heavy and hard object contained in the cotton passing onward from a bale-breaker, or other machine feeding unopened or only partially opened cotton or the like, through an intermediate flue to the said opener.

The present invention consists, essentially, in a mouth-piece in connection with the said intermediate flue, having an open lower end constituting a discharging mouth through which any heavy object such as a buckle, a nail, a stone, or the like, will fall in dropping through the mouth-piece, while the cotton fed into the mouth-piece will be carried through a horizontal flue-portion into the opener by a current of air entering through an air-inlet in the back of the mouth-piece, in line with such horizontal flue-portion.

The invention is illustrated in the drawings, applied in combination with a bale-breaker cooperating with a vertical opener.

Fig. 1 of the drawings shows in vertical section portions of the bale-breaker and vertical opener, together with the mouth-piece and horizontal flue-portion intermediate the two machines.

Figure 1:
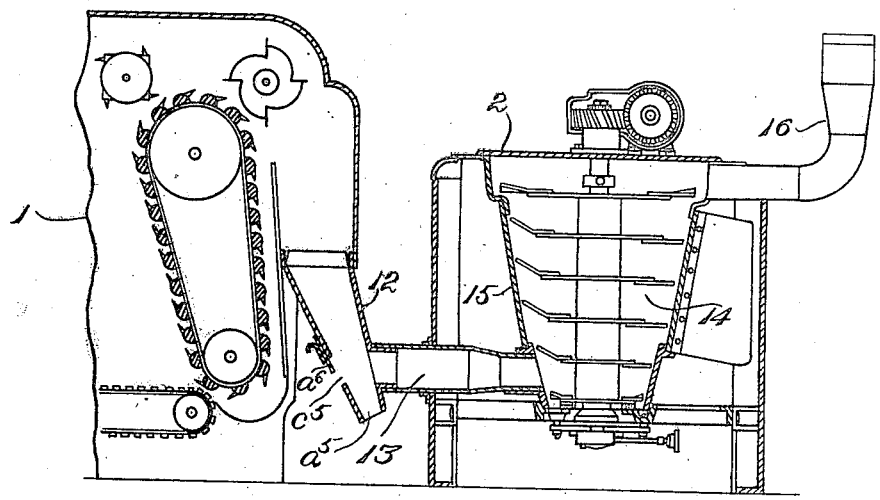
Figure 3:
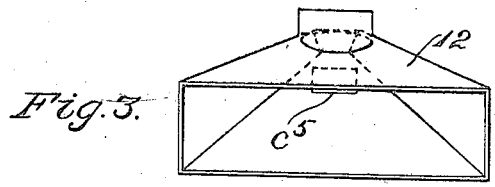
Fig. 3 is a top view thereof.
Figure 4:
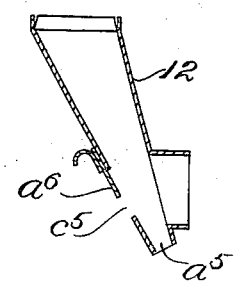
Fig. 4 is a view thereof in vertical section on line 4, 4, of Fig. 2.
Figure 2:
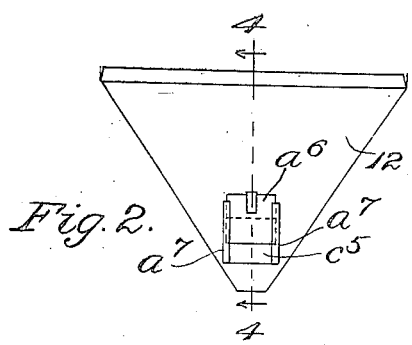
Fig. 2 is a rear elevation of the mouth-piece.

The bale-breaker 1 and vertical opener 2 which are partially shown in Fig. 1 are of more or less conventional type. 12 is the mouth-piece into which the material operated upon is fed by the delivering devices of the bale-breaker, and 13 is the horizontal flue-portion through which the material passes from the lower part of the mouth-piece to the interior of the vertical opener. 14 is the revolving so-called cylinder of the opener, 15 the perforated shell within which the said cylinder rotates, and 16 is the flue through which the opened material is carried to a bin or a distributing system after leaving the opener.

The "cylinder" of a vertical opener is, as shown, conical in shape, its small end being below and its large end above. The material to be subjected to the action of the said cylinder is supplied to the small lower end of the cylinder, and as the cylinder rotates the material passes from such end upward within the opener toward the large upper end of the cylinder, and from the top of the opener the material is discharged through the flue 16.

The mouth-piece 12 extends down to the level of the small lower end of the cylinder, and the horizontal flue-portion 13, located at such levels, leads inward to such end.

At $c^5$ is an air-inlet in the lower portion of the back wall of the mouth-piece, in line with the passage through the horizontal flue-portion 13. The inward current of air through the said inlet and across the lower portion of the mouth-piece, induced by the suction caused by the rotation of the cylinder, and by the fan constituting a part of the system, entering behind the fibrous material delivered by the bale-breaker into the mouth-piece and falling down between the air-inlet and such passage, operates to carry such material directly into and through the said passage.

In accordance with the invention, the lower end of the mouth-piece 12 below the air-inlet $c^5$ is open, providing a discharging mouth $a^5$ through which any heavy object such as a buckle, a nail, a stone, or the like, will fall in dropping to the said lower end, and thereby pass entirely out of the mouth-piece.

Ordinarily, the cotton fed into the mouth-piece by the delivering devices of the bale-breaker will be carried into the passage of the horizontal flue-portion 13 by the current of air flowing through the air-inlet $c^5$ and across the lower portion of the mouth-piece, and by such upflow of air as takes place through the discharging mouth itself. Only exceptionally compact and heavy tufts, etc., will pass out through the mouth $a^5$. The said upflow through the discharging mouth will not interfere with the dropping of heavy objects like those named out through such mouth.

For the purpose of enabling the area of the air-inlet $c^5$ to be varied at will, to thereby regulate the rate of flow of the current of air entering at such air-inlet, and through the discharging mouth $a^5$, and the effect of the suction in carrying cotton into the horizontal flue-portion 13, I provide a damper for the air-inlet, by means of which the air-inlet may be closed or opened to any required extent, such damper consisting in this instance of a slide $a^6$ mounted in guides $a^7$, $a^7$, upon the back of the lower portion of the mouth-piece.

What is claimed as the invention is,—

1. In preparing machinery, the combination with an opener, a supply flue leading thereto, and means operating to supply fibrous material, of a mouth-piece receiving the material from the said means, having at one side an opening through which the material passes from the mouth-piece into the passage through said supply-flue and at the other an air-inlet opposite the said opening, through which air enters behind falling material in line with the opening and also having at its lower end a discharging mouth through which heavy foreign objects drop from the interior of the mouth-piece.

2. In preparing machinery, the combination with an opener, a supply flue leading thereto, and means operating to supply fibrous material, of a mouth-piece receiving the material from the means having at one side an opening through which the material passes from the mouth-piece into the passage through said supply-flue and at the other an air-inlet opposite the said opening, through which air enters behind material in line with the opening, and having at its lower end a discharging mouth through which heavy foreign objects drop from the interior of the mouth-piece, and an adjustable damper by which the rate of air-flow through said air-inlet is regulated.

In testimony whereof I affix my signature in presence of two witnesses.

JOSEPH MOSS.

Witnesses:
HARRY DILLABER ALLEN,
HERMAN NOVA.